United States Patent
Tsuruma

(10) Patent No.: US 11,290,003 B2
(45) Date of Patent: Mar. 29, 2022

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Yoshinori Tsuruma, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/284,686

(22) PCT Filed: Jun. 20, 2019

(86) PCT No.: PCT/JP2019/024526
§ 371 (c)(1),
(2) Date: Apr. 12, 2021

(87) PCT Pub. No.: WO2020/255338
PCT Pub. Date: Dec. 24, 2020

(65) Prior Publication Data
US 2021/0359593 A1 Nov. 18, 2021

(51) Int. Cl.
*H02M 1/38* (2007.01)
*H02M 7/487* (2007.01)
*H02M 7/5387* (2007.01)

(52) U.S. Cl.
CPC ........... *H02M 1/385* (2021.05); *H02M 7/487* (2013.01); *H02M 7/53871* (2013.01)

(58) Field of Classification Search
CPC .......... H02M 1/38; H02M 1/385; H02M 7/48; H02M 7/487; H02M 7/5387; H02M 7/53871
See application file for complete search history.

(56) References Cited

U.S. PATENT DOCUMENTS

| 5,206,802 A | 4/1993 | Blasko |
| 10,951,144 B2 * | 3/2021 | Matsumoto .............. H02K 9/06 |

(Continued)

FOREIGN PATENT DOCUMENTS

| GB | 2 238 188 A | 5/1991 |
| JP | 9-84360 A | 3/1997 |
| JP | 2001-136750 A | 5/2001 |

OTHER PUBLICATIONS

International Search Report dated Sep. 10, 2019 in PCT/JP2019/024526 filed on Jun. 20, 2019.

(Continued)

*Primary Examiner* — Adolf D Berhane
(74) *Attorney, Agent, or Firm* — Oblon, McClelland, Maier & Neustadt, L.L.P.

(57) ABSTRACT

A power conversion device includes a three-level inverter circuit and an inverter control circuit for driving the three-level inverter circuit in a double carrier modulation manner. The inverter control circuit includes a command value calculating part generating three-phase output voltage command values, a command value correcting part outputting corrected command values by correcting to the three-phase output voltage command value, and a gate signal generating part generating a gate signal based on the corrected command values. The command value correcting part is configured to output a predetermined voltage command value corresponding to an end of a dead band instead of one AC voltage command value, and distribute a difference between the one AC voltage command value and the predetermined voltage command value in the dead band passage period to other two AC voltage command values, during a dead band passage period.

4 Claims, 11 Drawing Sheets

(56) References Cited

U.S. PATENT DOCUMENTS

2018/0102723 A1\* 4/2018 Kawashima ............ H02P 21/22
2021/0067056 A1\* 3/2021 Tajima .............. H02M 7/53871
2021/0091662 A1\* 3/2021 Tawada ..................... G05F 1/10
2021/0194383 A1\* 6/2021 Tsu ..................... H02M 7/5395

OTHER PUBLICATIONS

Extended European Search Report dated Sep. 16, 2020 in European Application No. 19 87 2259 filed on Jun. 20, 2019, 9 pages.
European Office Action dated Mar. 16, 2021 in European Application No. 19 87 2259.7 filed on Jun. 20, 2019, 5 pages.
Indian Office Action dated Mar. 1, 2021 in Indian Application No. 202017015465 filed on Apr. 8, 2020, 5 pages.

\* cited by examiner

F I G. 1 1
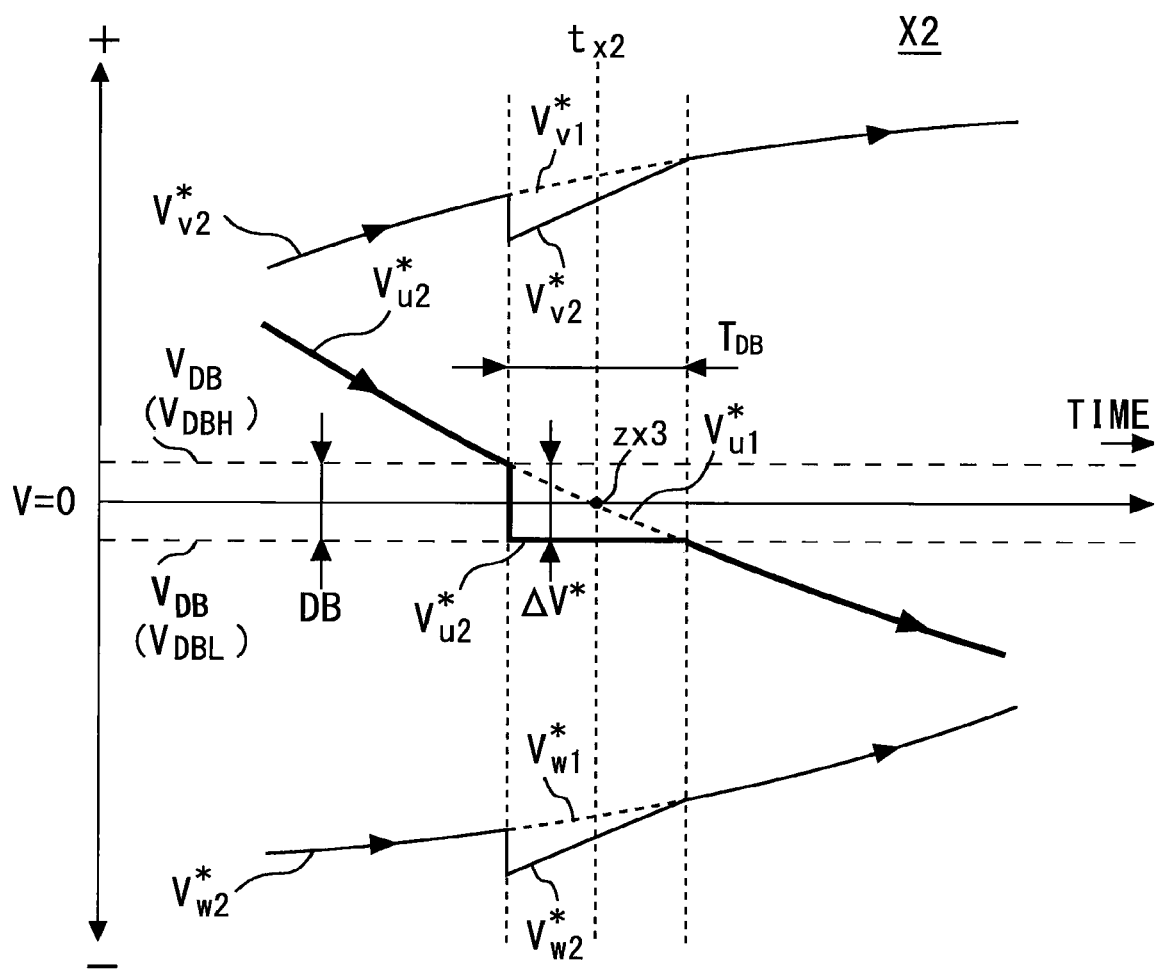

POWER CONVERSION DEVICE

TECHNICAL FIELD

The present application relates to a power conversion device.

BACKGROUND

Conventionally, for example, as described in JP 2001-136750, an inverter circuit of a double carrier modulation method is known. In this publication, a paragraph 0002 and FIG. 10 describe a three-level inverter circuit of a neutral point potential clamp manner.

PWM pulses applied to the three-level inverter are generally created by comparing a command voltage with a triangle-wave carrier. As an example of a PWM pulse generation method, an example of double carrier unipolar modulation is described in this paragraph 0002 and FIG. 8. According to FIG. 8, a single command voltage is compared with two triangular-wave carriers of different levels. During a period in which the command voltage exceeds the triangular-wave carrier, switching elements are conducted.

CITATION LIST

Patent Literature

[PTL 1] JP 2001-136750 A

SUMMARY

Technical Problem

Dead time is generally provided to prevent arm short circuit of an arm circuit in the inverter circuit. The dead time is a delay time for shifting on-off timings of the semiconductor switching elements. The length of the dead time determines how much to delay a turn-on edge of a PWM pulse.

FIG. 9 is a diagram for explaining a double carrier modulation manner. FIG. 9 illustrates a reference axis representing a zero value of a voltage command value V* (V*=0). Intersections between AC voltage command values $V^*_u$, $V^*_v$, $V^*_w$ and the zero value of the voltage command value are also referred to as "zero cross". FIG. 9 illustrates a broken line frame representing a "zero cross vicinity region X0".

The zero cross vicinity region X0 is a region near the zero cross of the AC voltage command values. Waveform tips of each of two triangular-wave carrier signals CW1, CW2 are arranged in the zero cross vicinity region X0. Since each tip width of the triangular-wave carrier signals CW1, CW2 is narrow, a width of the PWM pulse tends to be generated narrowly in the vicinity of the zero-cross of the AC voltage command value $V^*_u$, $V^*_v$, $V^*_w$.

Even if PWM pulses having too narrow width are attempt to be generated, such narrow pulses may be extinguished by the dead time of the inverter circuit. Since the dead time extinguishes the PWM pulse, there is a problem that controllability of the inverter control is likely to decrease in the vicinity of zero cross of the voltage command value.

The present application has been made to solve the problems as described above, and an object thereof is to provide an improved power conversion device so that controllability does not decrease in the vicinity of zero cross of a voltage command value.

Solution to Problem

A power conversion device according to the present application includes:
a three-level inverter circuit including a plurality of semiconductor switching elements; and
an inverter control circuit outputting a gate signal to driving the three-level inverter circuit in a double carrier modulation manner, the inverter control circuit including
a command value calculating part generating three-phase output voltage command values having one AC voltage command value and other two AC voltage command values based on an output current and an output voltage from the three-level inverter circuit,
a command value correcting part outputting corrected command values by correcting the three-phase output voltage command values, and
a gate signal generating part generating the gate signal based on the corrected command values,
wherein the command value correcting part is configured to, during a dead band passage period in which the one AC voltage command value passes through a dead band predetermined around a zero value of a voltage command value, output a predetermined voltage command value corresponding to an end of the dead band instead of the one AC voltage command value, and distribute a difference between the one AC voltage command value and the predetermined voltage command value in the dead band passage period to each of the other two AC voltage command values.

Advantageous Effects of Invention

According to the power conversion device according to the present application, a dead band is set in the vicinity of the zero cross. When one AC voltage command value passes through the dead band, the AC voltage command value can be limited so that a small value immediately before the zero cross is not set as the AC voltage command value. The one AC voltage command value is stagnated by this limitation, the stagnation is distributed to other two AC voltage command values, and thereby appropriate three-phase output voltage command values are given to the inverter circuit as a whole. Thus, it is possible to suppress controllability deterioration in the vicinity of zero cross.

BRIEF DESCRIPTION OF DRAWINGS

FIG. 11 is a time chart for explaining operation of the command value correcting part according to a modification of the embodiment.

DESCRIPTION OF EMBODIMENTS

Figure 1:
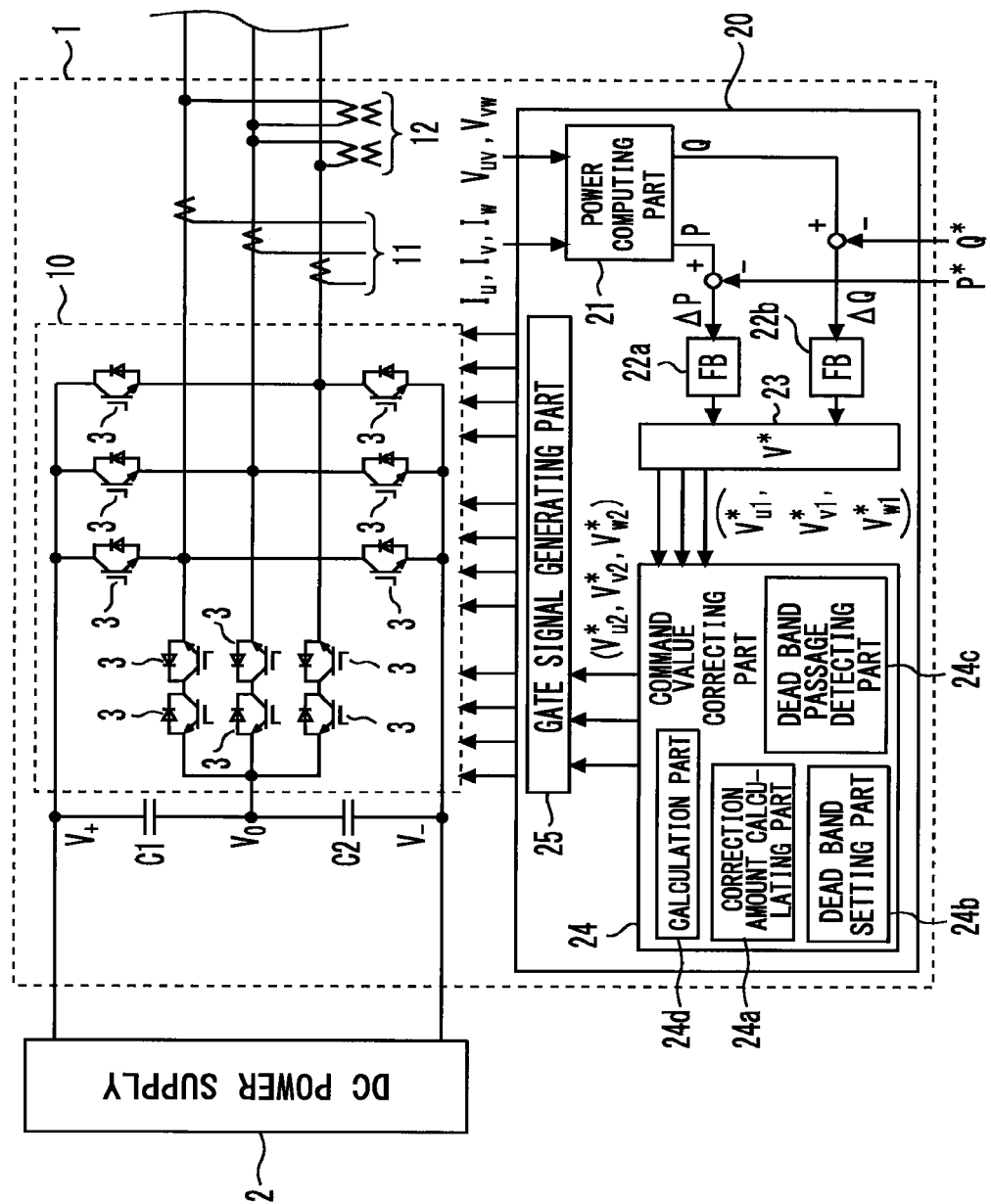
FIG. 1 is a diagram of a configuration of a power conversion device according to an embodiment.

FIG. 1 is a diagram showing a configuration of a power conversion device 1 according to an embodiment. The power conversion device 1 converts DC power from a DC power supply 2 into three-phase AC power. The power conversion device 1 includes input capacitors C1, C2, a three-level inverter circuit 10, an inverter control circuit 20, current transformers (CT) 11, and potential transformers (VT) 12.

The three-level inverter circuit 10 includes a plurality of semiconductor switching elements 3. The three-level inverter circuit 10 is an inverter circuit having a neutral point switch configuration. The semiconductor switching elements 3 are power semiconductor elements such as an insulated gate bipolar transistors (IGBTs).

The three-level inverter circuit 10 includes an arm circuit. The arm circuit is a circuit in which a plurality of semiconductor switching elements 3 are connected in series.

As shown in FIG. 1, a positive electrode output of the DC power supply 2 is connected to a high-side bus of the three-level inverter circuit 10, and high-side potential V+ is applied to the high-side bus. A negative electrode output of the DC power supply 2 is connected to a low-side bus of the three-level inverter circuit 10, and low-side potential V− is applied to the low-side bus.

The input capacitors C1, C2 forms a series circuit, and one end of the series circuit is connected to the high-side bus. Another end of the series circuit formed by the input capacitor C1, C2 is connected to the low-side bus. Neutral point potential V0 is given from a connection point between the input capacitor C1 and the input capacitor C2.

Gate pulses which are gate signals are applied to a control electrode of each of the semiconductor switching elements 3. The gate pulses are generated by the inverter control circuit 20. The gate pulses are pulse width modulation (PWM) pulses. Each gate pulse turns on and off each of the plurality of semiconductor switching elements 3.

Each of the current transformers 11 and the potential transformers 12 converts three-phase output currents Iu, Iv, Iw and three-phase output voltages Vu, Vv, Vw of the three-level inverter circuit 10, and transmits them to the inverter control circuit 20.

The inverter control circuit 20 includes a power computing part 21, feedback control parts 22a, 22b, an inverter voltage command calculating part 23 for generating a voltage command value V*, a command value correcting part 24, and a gate signal generating part 25.

In the embodiment, as an example, three-phase output voltage command values are calculated according to the following calculation logic. The power calculating part 21 calculates an active power measurement value and a reactive power measurement value based on measurement values from the potential transformers 12 and measurement values from the current transformers 11. The inverter control circuit 20 receives a command value from an inverter voltage command calculation unit (not shown) provided outside the inverter control circuit 20. The command value includes an active power command value P* and a reactive power command value Q*.

Active power difference ΔP is calculated in a first subtraction block. The active power difference ΔP is difference between an active power measurement value P from the power calculating part 21 and the active power command value P. Reactive power difference ΔQ is calculated in a second subtraction block. The reactive power difference ΔQ is difference between a reactive power measurement value Q from the power calculating part 21 and the reactive power command value Q*.

The feedback control part 22a performs a conventional feedback control to the active power difference ΔP. The feedback control part 22b performs a conventional feedback control to the reactive power difference ΔQ. Each feedback control may be selected from any one of PI control, P control, and PID control.

The inverter voltage command calculating part 23 generates the three-phase voltage command values based on an active power command value from the feedback control part 22a and a reactive power command value from the feedback control part 22b. That is, the inverter voltage command calculation part 23 receives a series of control processing results which the power calculation part 21, the subtraction blocks, and the feedback control parts 22a, 22b provide based on the three-phase output currents Iu, Iv, Iw and the three-phase output voltages Vu, Vv, Vw of the three-level inverter circuit 10.

Based on this series of control processing results, the inverter voltage command calculation part 23 generates three-phase output voltage command values $V^*_{u1}$, $V^*_{v1}$, $V^*_{w1}$.

It should be noted that, instead of the computational logic based on active power and reactive power as described above, the inverter control circuit 20 according to a modification of the embodiment may be configured so that the three-phase output voltage command values are set according to MPPT (Maximum Power Point Tracking) control. Such setting method of the three-phase output voltage command values by MPPT control according to such a modification can be used, for example, when the DC power supply 2 is a solar cell array.

The three-phase output voltage command values $V^*_{u1}$, $V^*_{v1}$, $V^*_{w1}$ include a first-phase AC voltage command value $V^*_{u1}$ and a second-phase AC voltage command value $V^*_{v1}$ and a third-phase AC voltage command value $V^*_{w1}$.

The command value correcting part 24 corrects the three-phase output voltage command values $V^*_{u1}$, $V^*_{v1}$, $V^*_{w1}$ to output corrected command values $V^*_{u2}$, $V^*_{v2}$, $V^*_{w2}$. Contents of the correction is such that, first, the command value correcting part 24 outputs a predetermined voltage command value $V_{DB}$ corresponding to an end of a dead band DB instead of one AC voltage command value passing through the dead band DB during a dead band passage period $T_{DB}$.

The dead band passage period $T_{DB}$ is a period in which one AC voltage command value among the three-phase output voltage command values $V^*_{u1}$, $V^*_{v1}$, $V^*_{w1}$ passes through the dead band DB. The dead band DB is a command value range which is predetermined around a zero value (V*=0) of the voltage command value V*. Width of the dead band DB is defined by a dead band upper limit value $V_{DBH}$ and a dead band lower limit value $V_{DBL}$. The dead band upper limit value $V_{DBH}$ and the dead band lower limit value $V_{DBL}$ are values for determining a plus end and a minus end in the dead band DB, and these are also referred to as predetermined voltage command values $V_{DB}$.

The command value correcting part 24 outputs one of the predetermined voltage command values $V_{DB}$ during the dead band passage period $T_{DB}$, and distributes difference $\Delta V^*$ to other two AC voltage command values. The "other two AC voltage command values" are two AC voltage command values outside the dead band DB among the three-phase output voltage command values $V^*_{u1}$, $V^*_{v1}$, $V^*_{w1}$. The difference $\Delta V^*$ is a difference value between the one AC voltage command value passing through the dead band DB and the predetermined voltage command value $V_{DB}$, in the dead band passage period $T_{DB}$.

As a result of these corrections, the corrected command values $V^*_{u2}$, $V^*_{v2}$, $V^*_{w2}$ are outputted. The corrected command values $V^*_{u2}$, $V^*_{v2}$, $V^*_{w2}$ include a corrected first-phase AC voltage command value $V^*_{u2}$, a corrected second-phase AC voltage command value $V^*_{v2}$, and a corrected third-phase AC voltage command value $V^*_{w2}$.

Figure 2:
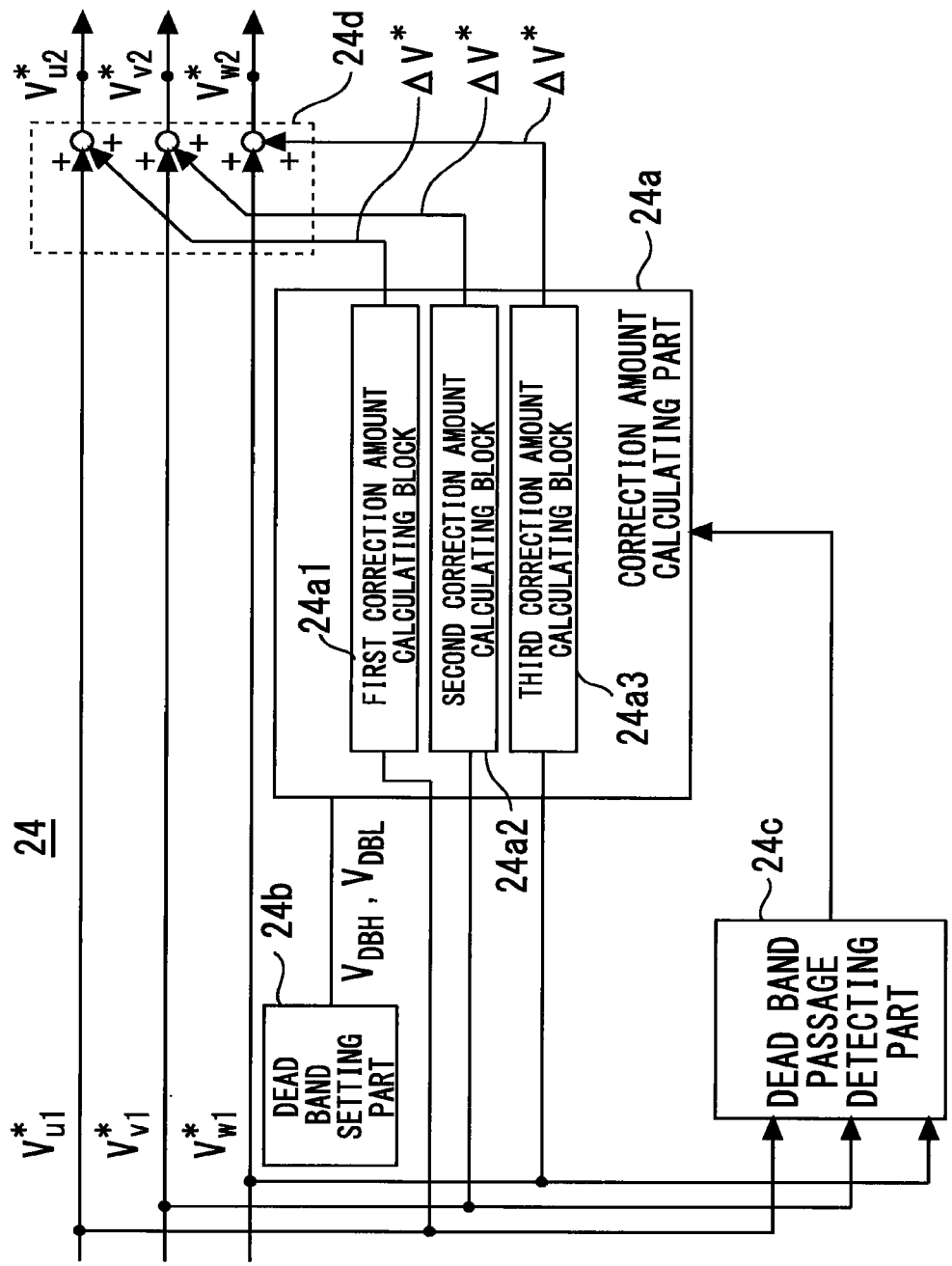
FIG. 2 is a diagram of a configuration of a command value correcting part in the power conversion device according to the embodiment.
Figure 3:
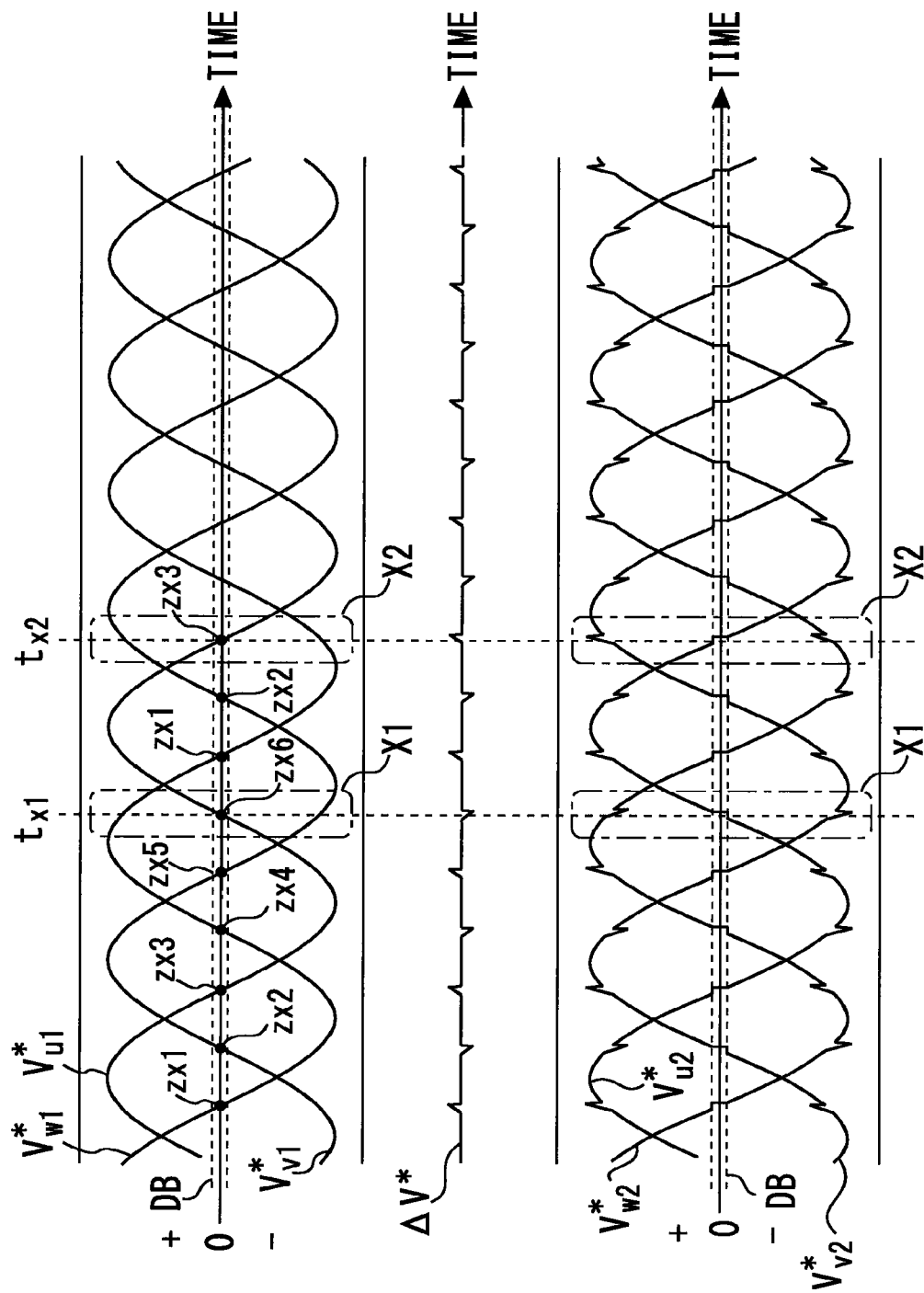
FIG. 3 is a time chart for explaining operation of the command value correcting part according to the embodiment.

FIG. 2 is a diagram of a configuration of the command value correcting part 24 in the power conversion device 1 according to the embodiment. FIGS. 3 to 6 are time charts for explaining operation of the command value correcting part 24 according to the embodiment. Upper part or FIG. 3 illustrates the three-phase output voltage command values $V^*_{u1}$, $V^*_{v1}$, $V^*_{w1}$. Lower part of FIG. 3 illustrates the corrected command values $V^*_{u2}$, $V^*_{v2}$, $V^*_{w2}$. Middle part of FIG. 3 illustrates a correction amount $\Delta V^*$ used in the correction.

It is recognized from FIG. 3 that a first zero-cross zx1, a second zero-cross zx2, a third zero-cross zx3, a fourth zero-cross zx4, a fifth zero-cross zx5, and a sixth zero-cross zx6 arrive repeatedly in this order.

Figure 4:
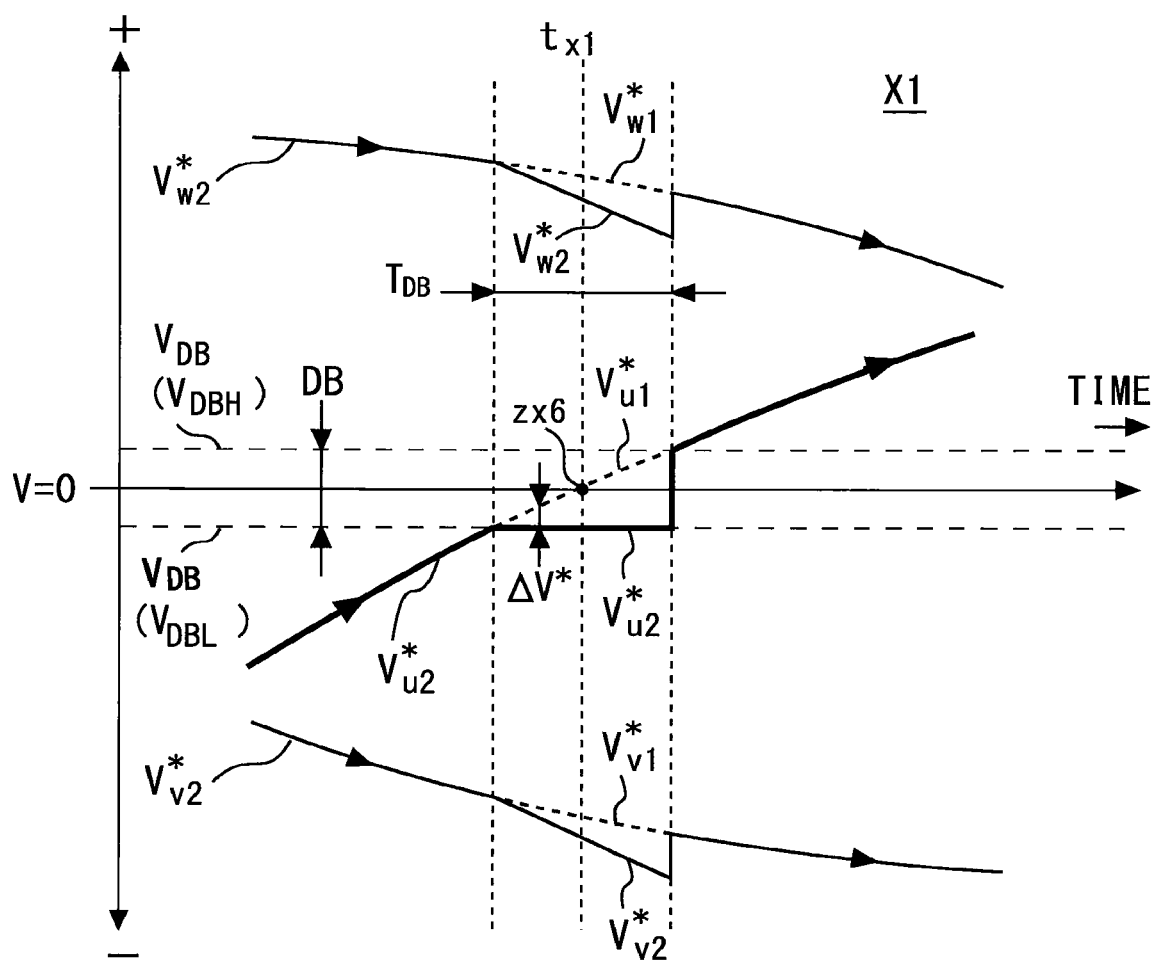
FIG. 4 is a time chart for explaining operation of the command value correcting part according to the embodiment.
Figure 5:
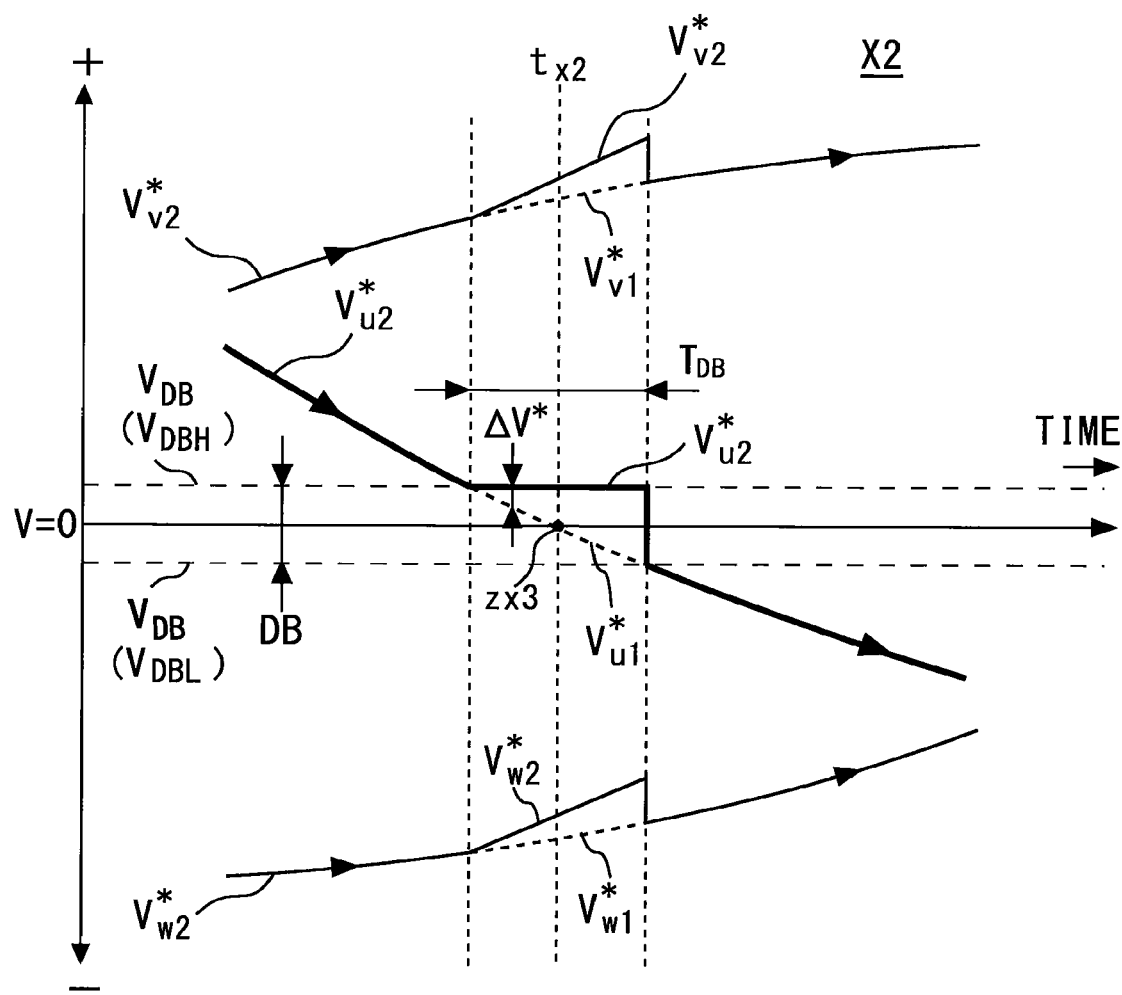
FIG. 5 is a time chart for explaining operation of the command value correcting part according to the embodiment.

FIG. 4 is an enlarged view of a broken-line portion X1 in FIG. 3 which indicates the vicinity of a time tx1. FIG. 5 is an enlarged view of a broken-line portion X2 in FIG. 3 which indicates the vicinity of the time tx2.

Hereinafter, configuration and operation of the command value correcting part 24 are described. In the following description, wordings of "one AC voltage command value" and "other two AC voltage command values" are used, for convenience. The "one AC voltage command value" refers to any one AC voltage command value among the three-phase output voltage command values $V^*_{u1}$, $V^*_{v1}$, $V^*_{w1}$.

The wording of "one AC voltage command value" is mainly used to distinguish an AC voltage command value passing through the dead band DB from other AC voltage command values. In the following description, the "one AC voltage command value" may be associated with an AC voltage command value of a particular phase; however any of the three-phase output voltage command values $V^*_{u1}$, $V^*_{v1}$, $V^*_{w1}$ may be substituted into the "one AC voltage command value".

On the other hand, the "other two AC voltage command values" refers to remaining two AC voltage command values other than the above described one AC voltage command value among the three-phase output voltage command values $V^*_{u1}$, $V^*_{v1}$, $V^*_{w1}$. The wording of "other two AC voltage command values" is mainly used to refer to AC voltage command values outside the dead band DB.

As shown in FIG. 2, the command value correcting part 24 includes a correction amount calculating part 24a, a dead band setting part 24b, a dead band passage detecting part 24c, and a correction calculation part 24d.

The dead band setting part 24b is a block for setting a width of the dead band DB. The dead band DB is a predetermined range around the zero value ($V^*=0$) of the voltage command value $V^*$ as described in FIGS. 3 to 6.

The dead band setting part 24b is configured to set changeably the dead band upper limit value $V_{DBH}$ and the dead band lower limit value $V_{DBL}$, respectively. In the embodiment, as an example, the dead band upper limit value $V_{DBH}$ and the dead band lower limit value $V_{DBL}$ are set to have a same magnitude, whereas positive-negative signs thereof are opposite. As a result, the dead band DB has the same width on a plus side and a minus side with respect to an axis of the reference value zero ($V^*=0$).

FIG. 4 illustrates correction operation performed in a period during which the first-phase AC voltage command value $V^*_{u1}$ passes through the dead hand DB from a low side (negative side) to a high side (positive side), as an example of the correction operation.

FIG. 4 illustrates an example of the correction operation such that correction operation performed in a period during which the second-phase AC voltage command value $V^*_{u1}$ passes through the dead band DB from a low side (negative side) to a high side (positive side).

FIG. 5 illustrates an example of correction operation performed in a period during which the first-phase AC voltage command value $V^*_{u1}$ passes through the dead band DB from the high side (positive side) to the low side (negative side).

The correction amount calculating part 24a calculates the difference $\Delta V^*$ between one AC voltage command value passing through the dead band DB and the predetermined voltage command value $V_{DB}$ in the dead band passage period $T_{DB}$. The difference $\Delta V^*$ is the correction amount $\Delta V^*$. Calculation cycle of the difference $\Delta V^*$ can be sufficiently small as compared with the dead band passage period $T_{DB}$.

The predetermined voltage command values $V_{DB}$ are values corresponding to each end of the dead band DB. In the embodiment, as an example, the predetermined voltage command value $V_{DB}$ for each of the three-phase output voltage command values $V^*_{u1}$, $V^*_{v1}$, $V^*_{w1}$ is defined as each point at which each of the three-phase output voltage command values $V^*_{u1}$, $V^*_{v1}$, $V^*_{w1}$ and the dead band DB cross each other when each of these command values enters the dead band DB.

That is, when each of the three-phase output voltage command values $V^*_{u1}$, $V^*_{v1}$, $V^*_{w1}$ enters the dead band DB from the positive side, the dead band upper limit value $V_{DBH}$ is the predetermined voltage command value $V_{DB}$ which the correction amount calculating part 24a uses to calculate the difference. Conversely, when each of the three-phase output voltage command values $V^*_{u1}$, $V^*_{v1}$, $V^*_{w1}$ enters the dead band DB from the negative side, the dead band lower limit value $V_{DBL}$ is the predetermined voltage command value $V_{DB}$ which the correction amount calculating part 24a uses to calculate the difference.

In the embodiment, as shown in FIG. 2, the correction amount calculating part 24a includes a first correction amount calculating block 24a1, a second correction amount calculating block 24a2, and a third correction amount calculating block 24a3.

The first correction amount calculating block 24a1 calculates the correction amount $\Delta V^*$ based on the predetermined voltage command value $V_{DB}$ of the dead band setting part 24b and the first-phase AC voltage command value $V^*_{u1}$ in accordance with a zero-cross direction detected by the dead band passage detecting part 24c. Specifically, either one of $V_{DBH}$ and $V_{DBL}$ is selectively set to the predetermined voltage command value $V_{DB}$ for a correction amount calculation.

The second correction amount calculating block 24a2 calculates the correction amount $\Delta V^*$ based on the predetermined voltage command value $V_{DB}$ of the dead band setting part 24b and the second-phase AC voltage command value $V^*_{v1}$ in accordance with a zero-cross direction detected by the dead band passage detecting part 24c. The third correction amount calculating block 24a3 calculates the correction amount $\Delta V^*$ based on the predetermined voltage command value $V_{DB}$ of the dead band setting part 24b and the third-phase AC voltage command value $V^*_{w1}$ in accordance with a zero-cross direction detected by the dead band passage detecting part 24c.

The correction calculating part 24d adds the correction amount $\Delta V^*$ to each of the three-phase output voltage command values $V^*_{u1}$, $V^*_{v1}$, $V^*_{w1}$. The addition by the correction calculation part 24d can generate each of the corrected command values $V^*_{u2}$, $V^*_{v2}$, $V^*_{w2}$.

According to the above control processing, first, the command value correcting part 24 adds the correction amount $\Delta V^*$ to the one AC voltage command value from which the correction amount $\Delta V^*$ is calculated, during the dead band passage period $T_{DB}$. In the example of FIG. 4, $\Delta V^*$ is added to the one AC voltage command value $V^*_{u1}$. By this addition processing, the one AC voltage command value is fixed to the dead band lower limit value $V_{DBL}$.

Therefore, the predetermined voltage command value $V_{DB}$ corresponding to the end of the dead band DB is outputted instead of the one AC voltage command value, and the predetermined voltage command value $V_{DB}$ is regarded as the corrected command value $V^*_{u2}$. As a result, it is possible to discontinuously change the voltage command value in the vicinity of the zero cross so that the value of the one AC voltage command value becomes not too small.

In addition to this, the command value correcting part 24 adds the correction amount $\Delta V^*$ to the other two AC voltage command values during the dead band passage period $T_{DB}$. In the example of FIG. 4, the correction amount $\Delta V^*$ is added to the other two AC voltage command values $V^*_{v1}$, $V^*_{w1}$. By this addition processing, the difference $\Delta V^*$ is distributed to the other two AC voltage command values, and the command values after the distribution is regarded as the corrected command values. The distribution of the command values for the other two AC voltage command values makes it possible to hold a phase-to-phase voltage in the three phases.

The gate signal generating part 25 generates gate signals based on the corrected command values $V^*_{u2}$, $V^*_{v2}$, $V^*_{w2}$ from the command value correcting part 24. The gate signal is a gate driving PWM signal for the semiconductor switching elements 3 which the three-level inverter circuit 10 has.

The gate signal generating part 25 includes a dead time generating part, a carrier signal generating part, and a PWM signal generating part.

The dead time generating part will now be described. Dead time is provided to prevent arm short circuit in the arm circuit of the three-level inverter circuit 10. The dead time is a delay time between an ON-timing of a high-side semiconductor switching element 3 and an ON-timing of a low-side semiconductor switching element 3 consisting one arm circuit with the high-side semiconductor switching element 3. A length of the dead time determines how much to delay a turn-on edge of the PWM pulse. Since dead time setting technique in an inverter circuit is a known technique and is not a novel matter, detailed descriptions thereof will be omitted.

A carrier signal generating part will now be described. The gate signal generating part 25 outputs the gate signal for driving the three-level inverter circuit 10 in the double carrier modulation manner. The double-carrier modulation manner uses two triangular-wave carrier signals CW1, CW2 having different levels (see FIG. 6). The gate signal generating part 25 includes a carrier signal generating part (not shown) to output these triangular-wave carrier signals CW1, CW2.

Figure 6:
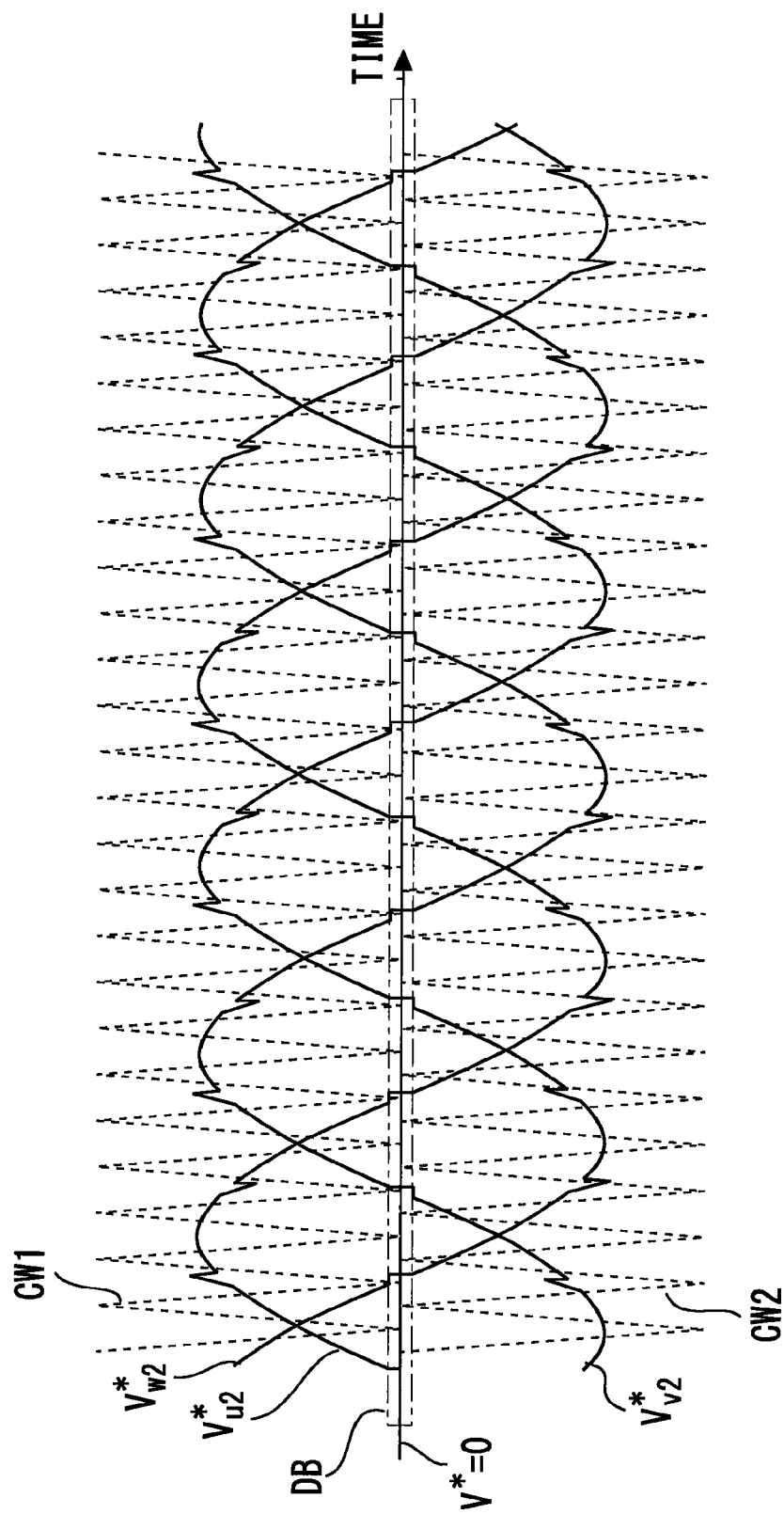
FIG. 6 is a time chart for explaining operation of the command value correcting part according to the embodiment.

As shown in FIG. 6, the two triangle-wave carrier signals CW1, CW2 includes a high-level triangle-wave carrier signal CW1 and a low-level triangle-wave carrier signal CW2. The high-level triangular-wave carrier signal CW1 is a carrier wave having a positive value with reference to the zero value ($V^*=0$) of the voltage command value $V^*$. The low-level triangular-wave carrier signal CW2 is a carrier wave having a negative value with reference to the zero value ($V^*=0$) of the voltage command value $V^*$.

The PWM signal generating part will now be described. As shown in FIG. 6, each of the corrected command values $V^*_{u2}$, $V^*_{v2}$, $V^*_{w2}$ crosses each of the high-level triangular-wave carrier signal CW1 and the low-level triangle-wave carrier signal CW2. Rising edges and falling edges of the gate pulses are determined based on intersection points at which the corrected command values $V^*_{u2}$, $V^*_{v2}$, $V^*_{w2}$ and the triangular-wave carrier signals CW1, CW2 cross each other.

As an example, the PWM gate pulse is generated so as to conduct each switching elements while each of the corrected command values $V^*_{u2}$, $V^*_{v2}$, $V^*_{w2}$ exceeds each of the triangular-wave carrier signals CW1, CW2. It should be noted that technique of creating a PWM pulse by comparing a voltage command value and a triangular-wave carrier has already been known and is not a novel matter, and thus further description of the PWM signal generating part will be omitted.

Figure 9:
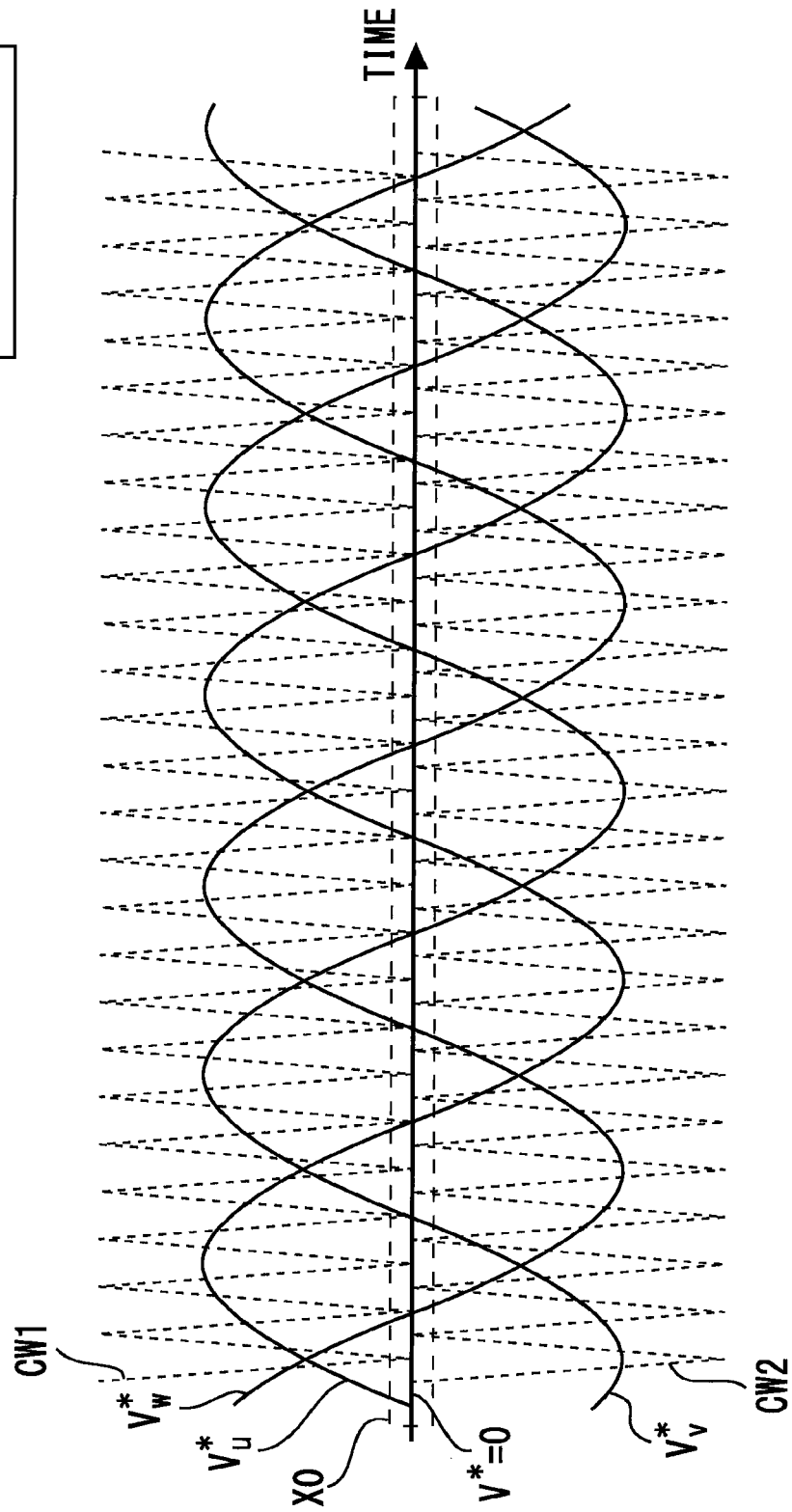
FIG. 9 is a diagram for explaining a double carrier modulation manner as a related art.

The power conversion device 1 according to the embodiment described above achieves the following effects. Since each tip width of the triangular-wave carrier signals CW1, CW2 is narrow, a width of the PWM pulse may be narrowly generated in the vicinity of each zero cross of the AC voltage command values $V^*_u$, $V^*_v$, $V^*_w$ as described in the relevant art of FIG. 9.

In this regard, the power conversion device 1 according to the embodiment sets the dead band DB (see FIGS. 3 to 6) in the vicinity of zero cross of the voltage command values in order to suppress the PWM pulses having too narrow width. The dead band passage period $T_{DB}$ is detected based on the dead band DB. In the dead band passage period $T_{DB}$, a certain limit is performed to the one AC voltage command value by adding the correction amount $\Delta V^*$ so that a small value near the zero-cross is not set as the AC voltage command value. The certain limit causes the one AC voltage command value to be held at the predetermined voltage command value. The gate signal generating part 25 uses the predetermined voltage command value as the corrected command value $V^*_{u2}$.

According to these series of control processing, the limitation added to the value of the AC voltage command values in the vicinity of the zero cross makes is possible to prevent from being generated a narrow pulse which is so small to be extinguished by the dead time of the inverter circuit. As a result, it is possible to suppress controllability deterioration in the inverter control in the vicinity of zero cross of the voltage command value.

Further, according to the embodiment, a stagnant amount in the one AC voltage command value $V^*_{u1}$ by adding the correction amount $\Delta V^*$ is distributed to each of the other two AC voltage command values $V^*_{v1}$, $V^*_{w1}$. The gate signal generating part 25 uses the values after the distribution as the corrected command values $V^*_{v2}$, $V^*_{w2}$. Thus, it is possible to maintain the phase-to-phase voltage properly in the three phases.

In this way, although the correction is applied to each of the three-phase output voltage command values $V^*_{u1}$, $V^*_{v1}$, $V^*_{w1}$ during the dead band passage period $T_{DB}$, it is possible to provide appropriate corrected command values $V^*_{u2}$, $V^*_{v2}$, $V^*_{w2}$ to the inverter circuit 10 as a whole. This makes it possible to suppress controllability deterioration in the vicinity of zero cross of the voltage command values. Thus, for example, it is possible to suppress problems such as current distortion in the vicinity of zero cross of the voltage command values.

In the embodiment, since the command value correcting part 24 includes the dead band setting part 24b to set the dead band DB, there is an advantage that the width of the dead band DB can be changed. As a result, the advantage makes it possible to set the dead band DB to be a necessary sufficient width for suppressing the controllability deterioration in the vicinity of zero cross of the voltage command values.

In the embodiment, since the command value correcting part 24 includes the dead band passage detecting part 24c, there is an advantage that the dead band passage period $T_{DB}$ can be accurately detected.

In the embodiment, the command value correcting part 24 includes the correction amount calculating part 24a and the correction calculation part 24d. This makes it possible to generate the corrected command values $V^*_{u2}$, $V^*_{v2}$, $V^*_{w2}$ by calculating one correction amount $\Delta V^*$ and adding this to each of the three-phase output voltage command values $V^*_{u1}$, $V^*_{v1}$, $V^*_{w1}$. Therefore, there is an advantage that hardware configuration or software processing can be simplified and complicated arithmetic processing is not necessary.

Figure 7:
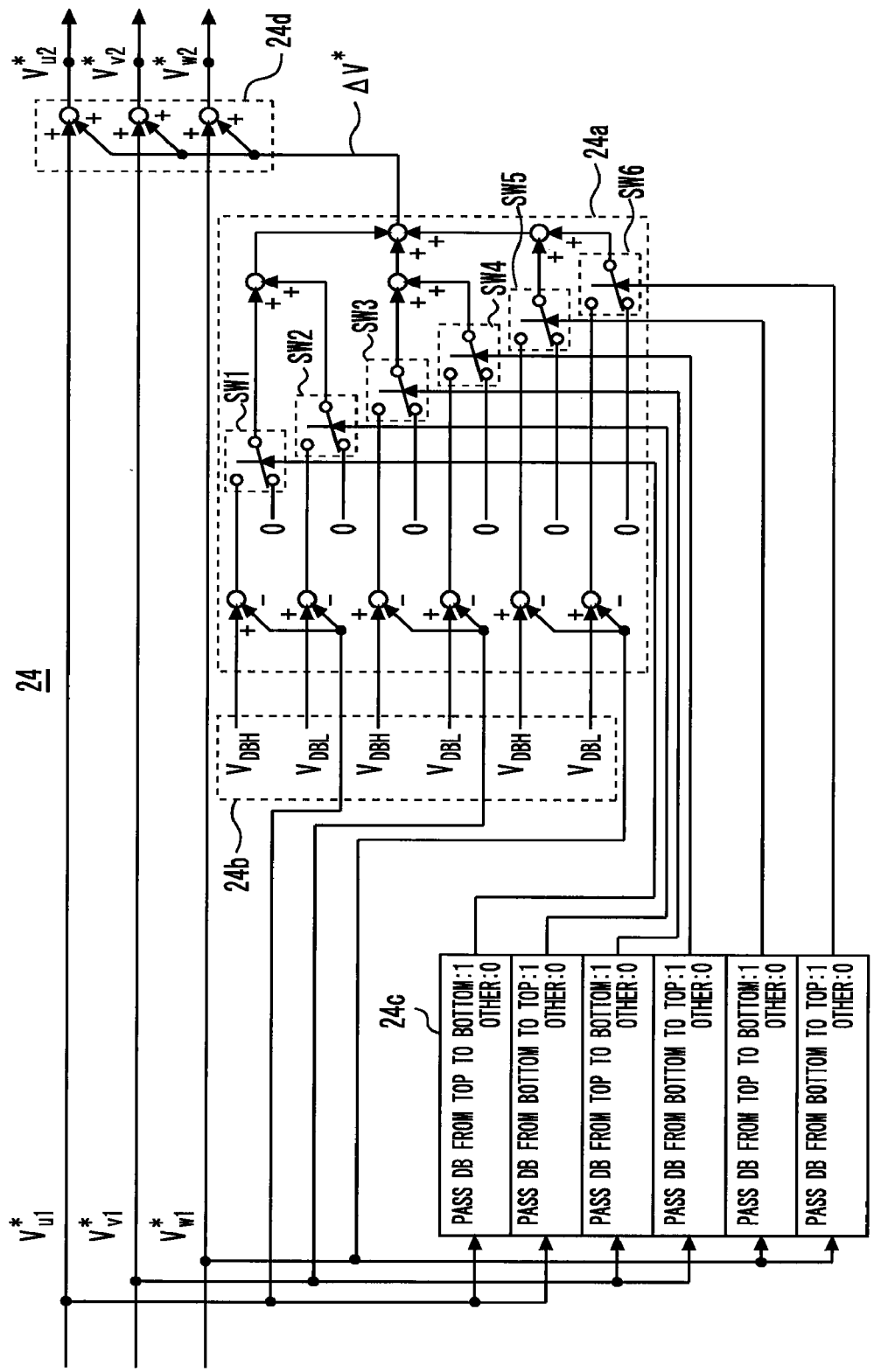
FIG. 7 is a diagram showing an example of a specific configuration of the command value correcting part in the power conversion device according to the embodiment.
Figure 8:
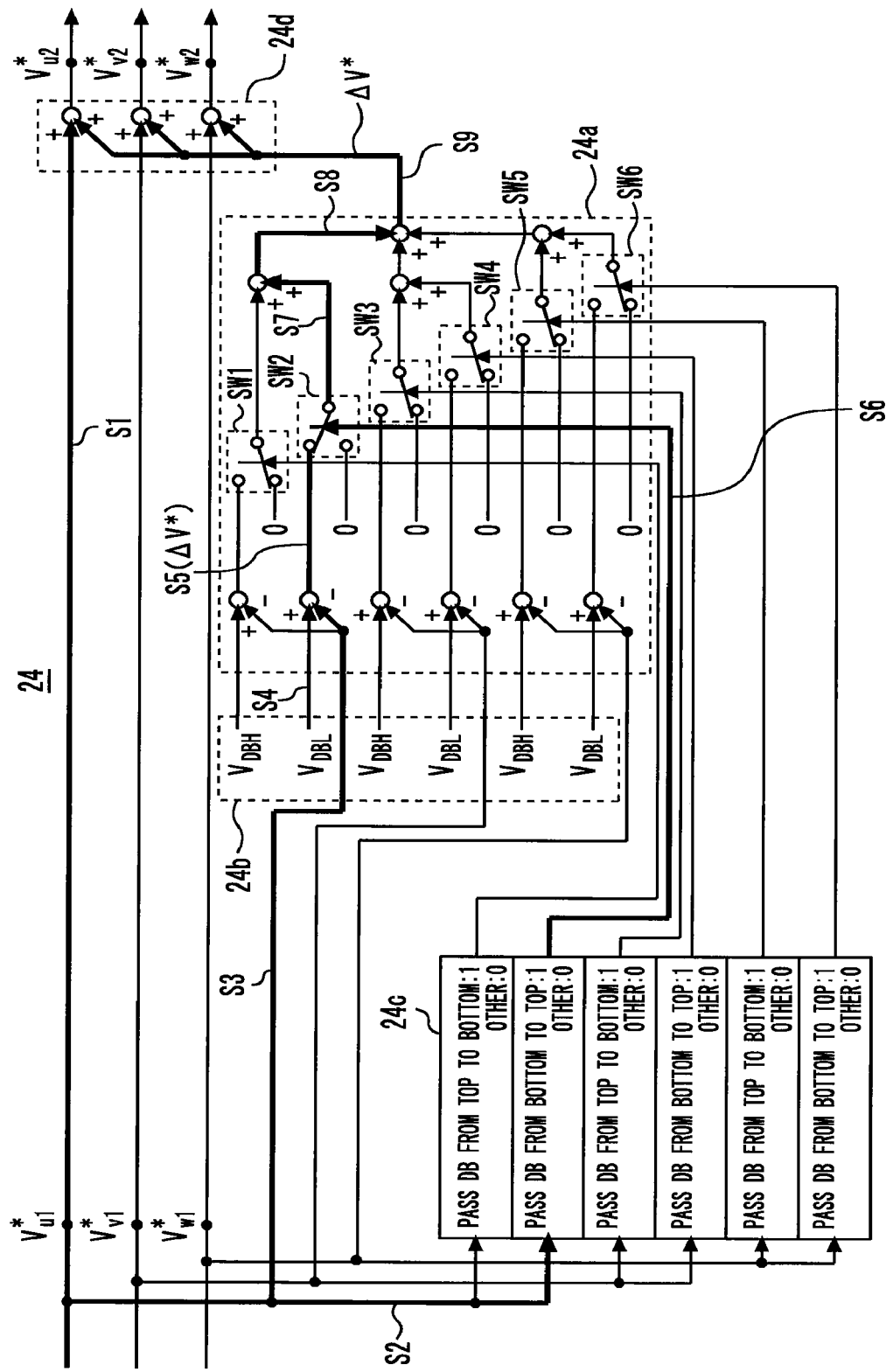
FIG. 8 is a diagram for explaining operation of the specific configuration of the command value correcting part in the power conversion device according to the embodiment.

FIG. 7 is a diagram illustrating an example of a specific configuration of the command value correcting part 24 provided in the power conversion device 1 according to the embodiment. FIG. 8 is a diagram for explaining operation of the specific configuration of the command value correcting part 24 provided in the power conversion device 1 according to the embodiment is provided. The command value correcting part 24 in FIG. 7 has configuration in which each of the correction amount calculating part 24a, the dead band setting part 24b, the dead band passage detecting part 24c, and the correction calculation part 24d described in FIG. 2 is embodied.

The dead band passage detecting part 24c has six detection blocks. A first detection block outputs "1" when the first-phase AC voltage command value $V^*_{u1}$ is passing through the dead band DB from top to bottom, and outputs "0" when not. It should be noted that each wording of "up" and "bottom" referred to herein corresponds to each of the top and bottom of the paper surface of FIGS. 3 to 6 in the timing chart. For example, traveling of the voltage command value from the top to the bottom means that the voltage command value passes through the dead band DB from high side to low side.

A second detection block outputs "1" when the first-phase AC voltage command value $V^*_{u1}$ is passing through the dead band DB from the bottom to the top, and outputs "0" when not. A third detection block outputs "1" when the second-phase AC voltage command value $V^*_{v1}$ is passing through the dead band DB from the top to the bottom, and outputs "0" when not.

A fourth detection block outputs "1" when the second-phase AC voltage command value $V^*_{v1}$ is passing through the dead band DB from the bottom to the top, and outputs "0" when not. A fifth detection block outputs "1" when the third-phase AC voltage command value $V^*_{w1}$ is passing through the dead band DB from the top to the bottom, and outputs "0" when not. A sixth detection block outputs "1" when the third-phase AC voltage command value $V^*_{w1}$ is passing through the dead band DB from the bottom to the top, and outputs "0" when not.

The correction amount calculating part 24a includes six switches SW1~SW6. A first difference value between the dead band upper limit value $V_{DBH}$ and the first-phase AC voltage command value $V^*_{u1}$ is inputted into a first switch SW1. The first switch SW1 switches its output between the first difference value and zero in response to the output from the first detection block. If the output from the first detection block is "1", the first switch SW1 outputs the first difference value. If the output from the first detection block is "0", the first switch SW1 outputs zero.

A second difference value between the dead band lower limit value $V_{DBL}$ and the first-phase AC voltage command value $V^*_{u1}$ is inputted into a second switch SW2. The second switch SW2 switches its output between the second difference value and zero in response to the output from the second detection block. If the output from the second detecting block is "1", the second switch SW2 outputs the second difference value. If the output from the second detection block is "0", the second switch SW2 outputs zero.

A third difference value between the dead band upper limit value $V_{DBH}$ and the second-phase AC voltage command value $V^*_{v1}$ is inputted into a third switch SW3. The third switch SW3 switches its output between the third difference value and zero in response to the output from the third detection block. If the output from the third detection block is "1", the third switch SW3 outputs the third difference value. If the output from the third detection block is "0", the third switch SW3 outputs zero.

A fourth difference value between the dead band lower limit value $V_{DBL}$ and the second-phase AC voltage command value $V^*_{v1}$ is inputted into a fourth switch SW4. The fourth switch SW4 switches its output between the fourth difference value and zero in response to the output from the fourth detection block. If the output from the fourth detection block is "1", the fourth switch SW4 outputs the fourth difference value. If the output from the fourth detection block is "0", the fourth switch SW4 outputs zero.

A fifth difference value between the dead band upper limit value $V_{DBH}$ and the third-phase AC voltage command value $V^*_{w1}$ is inputted into a fifth switch SW5. The fifth switch SW5 switches its output between the fifth difference value and zero in response to the output from the fifth detection block. If the output from the fifth detecting block is "1", the fifth switch SW5 outputs the fifth difference value. If the output from the fifth detection block is "0", the fifth switch SW5 outputs zero.

A sixth difference value between the dead band lower limit value $V_{DBL}$ and the third-phase AC voltage command value $V^*_{w1}$ is inputted into a sixth switch SW6. The sixth switch SW6 switches its output between the sixth difference value and zero in response to the output from the sixth detection block. If the output from the sixth detection block is "1", the sixth switch SW6 outputs the sixth difference value. If the output from the sixth detection block is "0", the sixth switch SW6 outputs zero.

The correction amount calculating part 24a outputs the sum value of the first switch SW1 to the sixth switch SW6. However, as can be seen from FIG. 3, zero crossing timings of the three-phase output voltage command values $V^*_{u1}$, $V^*_{w1}$ are different from each other.

Specifically, as recognized from FIG. 3, the first zero-cross zx1 and the second zero-cross zx2 and the third zero-cross zx3 and the fourth zero-cross zx4 and the fifth zero-cross zx5 and the sixth zero-cross zx6 arrives repeatedly in this order.

The first zero-cross zx1 is a zero-cross at which the w-phase command value passes through the command value zero from the top to the bottom. The second zero-cross zx2 is a zero-cross at which the v-phase command value passes through the command value zero from the bottom to the top. The third zero-cross zx3 is a zero-cross at which u-phase command value passes through the command value zero from the top to the bottom.

The fourth zero-cross zx4 is a zero-cross at which the w-phase command value passes through the command value zero from the bottom to the top. The fifth zero-cross zx5 is a zero-cross at which the v-phase command value passes through the command value zero from the top to the bottom. The sixth zero-cross zx6 is a zero-cross at which the u-phase command value passes through the command value zero from the bottom to the top.

Note that "from the top to the bottom" means a change from a positive value to a negative value. "From the bottom to the top" means a change from a negative value to a positive value.

Therefore, a switch outputting a difference value other than zero will be alternated in the order of the fifth switch SW5, the fourth switch SW4, the first switch SW1, the sixth switch SW6, the third switch SW3, the second switch SW2, and the fifth switch SW5, . . . . Thus only one switch among the first switch SW1 to the sixth switch SW6 outputs the difference value other than zero, and each of the remaining switches outputs zero. This results in that the correction amount calculating part 24a selectively outputs any one value among the first difference value to the sixth difference value as the difference value ΔV*.

The correction calculation part 24d adds the difference value ΔV* outputted from the correction amount calculating part 24a to each of the three-phase output voltage command values $V^*_{u1}$, $V^*_{v1}$, $V^*_{w1}$.

With reference to FIG. 8, circuit operation of FIG. 7 will now be described in the case of zero cross shown in FIG. 4. FIG. 4 corresponds to the sixth zero-cross zx6 since the u-phase command value passes through the dead band DB from the bottom to the top. First, the first phase AC voltage command value $V^*_{u1}$ is transmitted to the correction calculation part 24d as a signal S1 in FIG. 8. At the same time, the first phase AC voltage command value $V^*_{u1}$ is inputted into the second block of the dead band passage detecting part 24c as a signal S2 in FIG. 8.

Further, the first-phase AC voltage command value $V^*_{u1}$ is inputted into the correction amount calculating part 24a as a signal S3 in FIG. 8. Further, the dead band setting part 24b inputs the dead band lower limit value $V_{DBL}$, which is a signal S4 in FIG. 8, into the correction amount calculating part 24a.

Difference between the dead band lower limit $V_{DBL}$ and the first-phase AC voltage command value $V^*_{u1}$ is calculated as the correction amount ΔV*. The correction amount ΔV* is illustrated as a signal S5 in FIG. 8.

The second block of the dead band passage detecting part 24c outputs "1" as in a signal S6 in FIG. 8. The signal S6 turns on the second switch SW2 of the correction amount calculating part 24a. The second switch SW2 that is turned on outputs the correction amount ΔV* as a signal S7.

Thereafter, the signal S7 becomes a signal S8 by being summed with an output signal from the first switch SW1, and the signal S8 becomes a signal S9 by being further summed with the output signals of the third switch SW3 to the sixth switch SW6. The signal S9 is an output of the correction amount calculating part 24a.

As described above, when the second switch SW2 calculates the correction amount ΔV*, all outputs from the other switches are zero. Therefore, the signal S9 is equal to a value of the signal S5. The correction calculation part 24d adds the correction amount ΔV* of the signal S9 to each of the three-phase output voltage command values $V^*_{u1}$, $V^*_{v1}$, $V^*_{w1}$.

Figure 10:
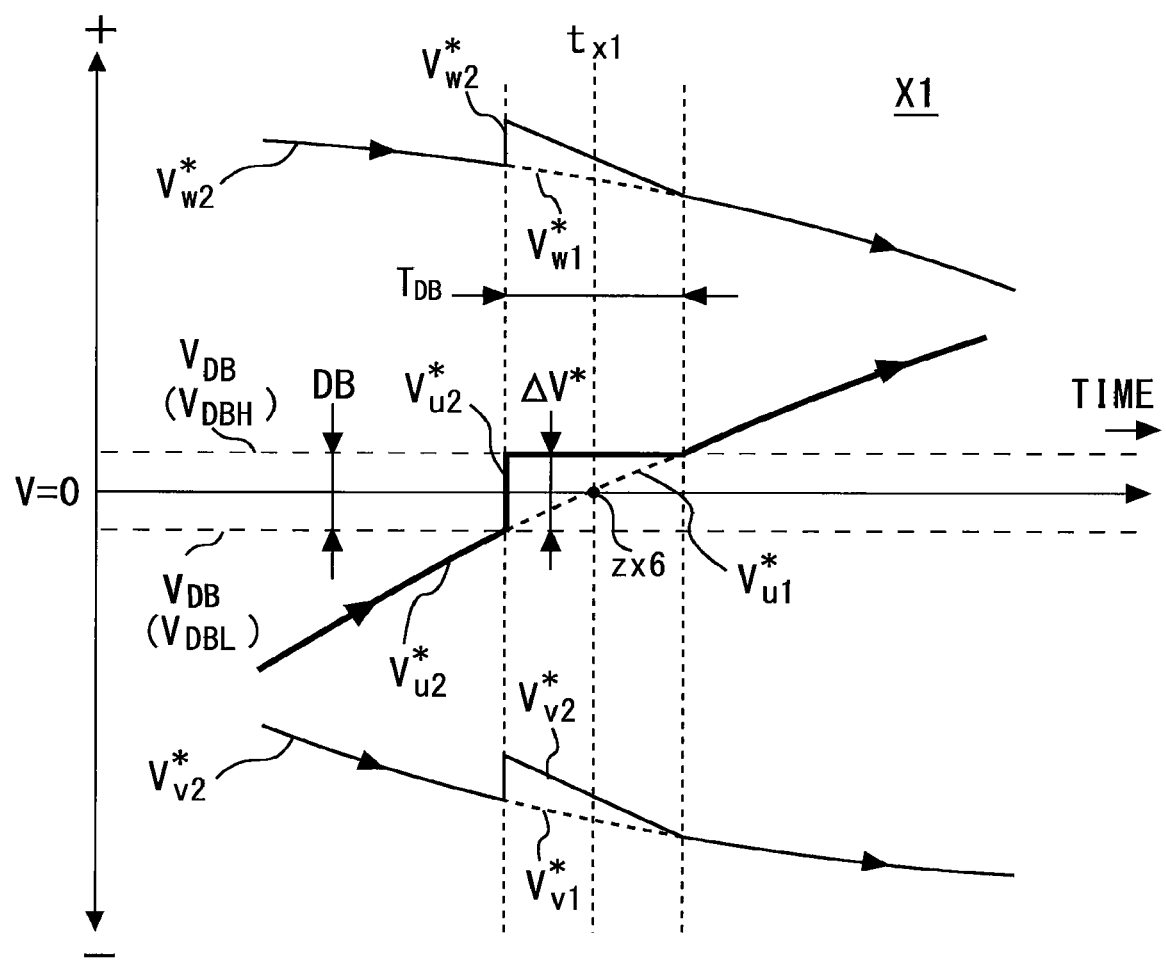
FIG. 10 is a time chart for explaining operation of the command value correcting part according to a modification of the embodiment.

FIGS. 10 and 11 are time charts for explaining operation of the command value correcting part 24 according to a modification of the embodiment. FIG. 10 is obtained by modifying correction operation in the vicinity of the time tx1 shown in FIG. 4. FIG. 11 is obtained by modifying correction operation in the vicinity of the time tx2 shown in FIG. 5.

Referring to FIGS. 4, 5, 10 and 11 in association with each other, there are four types of correction operation variations in the command value correcting part 24 as shown in the following table. A first correction operation is as described in FIG. 4. A second correction operation is described in FIG. 5. A "predetermined voltage command value" in Table 1 is a value to which the AC voltage command value passing through the dead band DB is affixed during the dead band passage period $T_{DB}$.

TABLE 1

|  | Zero-cross direction | Figure | Correction amount ΔV* | Predetermined voltage command value | Distribution to other two AC voltage command values |
|---|---|---|---|---|---|
| First correction operation | From low side to high side | FIG. 4 | Difference between $V_{DBL}$ and AC voltage command values ($V^*_{u1}$, $V^*_{v1}$, $V^*_{w1}$) | $V_{DBL}$ | Add ΔV* |
| Second correction operation | From high side to low side | FIG. 5 | Difference between $V_{DBH}$ and AC voltage command values ($V^*_{u1}$, $V^*_{v1}$, $V^*_{w1}$) | $V_{DBH}$ | Add ΔV* |

TABLE 1-continued

| | Zero-cross direction | Figure | Correction amount ΔV* | Predetermined voltage command value | Distribution to other two AC voltage command values |
|---|---|---|---|---|---|
| Third correction operation | From low side to high side | FIG. 10 | Difference between $V_{DBH}$ and AC voltage command values ($V^*_{u1}$, $V^*_{v1}$, $V^*_{w1}$) | $V_{DBH}$ | Add ΔV* |
| Fourth correction operation | From high side to low side | FIG. 11 | Difference between $V_{DBL}$ and AC voltage command values ($V^*_{u1}$, $V^*_{v1}$, $V^*_{w1}$) | $V_{DBL}$ | Add ΔV* |

A zero-cross direction in a third correction operation in FIG. 10 is a direction toward low side to high side (i.e. from the bottom to the top in the figure), and thus the direction is the same as the first correction operation in FIG. 4. However, the third correction operation calculates the difference value ΔV* by using not the dead band lower limit value $V_{DBL}$ which corresponds to an entrance-side end of the dead band DB but the dead band upper limit value $V_{DBH}$ which will become a leaving point from the dead band DB when entering the dead band DB.

A zero-cross direction in a fourth correction operation in FIG. 11 is a direction from high side to low side (i.e. from the top to the bottom in the figure), and thus the direction is the same as the second correction operation of FIG. 5. However, the fourth correcting operation calculates the difference ΔV* using not the dead band upper limit value $V_{DBH}$ which corresponds to an entrance-side end of the dead band DB but the dead band lower limit value $V_{DBL}$ which will become a leaving point from the dead band DB when entering the dead band DB.

It should be noted that, in order to achieve the third correction operation and the fourth correction operation, calculation logic for the difference value ΔV* may be modified in the circuit block of the command value correcting part 24 shown in FIGS. 2 and 7. Therefore, detailed circuit description is omitted.

The command value correcting part 24 can select one correction operation from the first correction operation and the third correction operation with respect to the zero-cross direction from low side to high side. The command value correcting part 24 can select one correction operation from the second correction operation and the fourth correction operation with respect to the zero-cross direction from high side to low side.

In the embodiment, the command value correcting part 24 executes the above first correction operation and the second correction operation. In contrast, as a modification, the command value correcting part 24 may execute the first correction operation and the fourth correction operation. Alternatively, as another modification, the command value correcting part 24 may execute the second correction operation and the third correction operation. Alternatively, as another modification, the command value correcting part 24 may execute the third correction operation and the fourth correction operation. Further, as a further modification, the command value correcting part 24 may be configured such that each of the first to fourth correction operations can be executable, and these operations may be selectively switched in accordance with conditions.

It should be noted that, as a modification of the three-level inverter circuit 10, an inverter circuit of a neutral point potential clamp manner may be used. One example of the inverter circuit of the neutral point potential clamp manner is described in FIG. 10 of JP 2001-136750, and such inverter circuit configuration of the neutral point potential clamp manner is not a novel matter. Therefore, figures and descriptions thereof are omitted.

REFERENCE SIGNS LIST

1 Power conversion device
2 DC power supply
3 Semiconductor switching elements
10 Inverter circuit (three-level inverter circuit)
11 Current transformer (CT)
12 Potential transformer (VT)
20 Inverter control circuit
21 Power calculating part
22a Feedback control part
22b Feedback control part
23 Inverter voltage command calculating part
24 Command value correcting part
24a Correction amount calculating part
24a1 First correction amount calculating block
24a2 Second correction amount calculating block
24a3 Third correction amount calculating block
24b Dead band setting part
24c Deadband passage detecting part
24d Correction calculation part
25 Gate signal generating part
C1, C2 input capacitor
CW1 Triangle-wave carrier signal (high-level triangle-wave carrier signal)
CW2 Triangle-wave carrier signal (low-level triangle-wave carrier signal)
DB Dead band
Iu, Iv, Iw Three-phase output current
P Active power measurement value
P* Active power command value
Q Reactive power measurement value
Q* Reactive power command value
$T_{DB}$ Dead band passage period
V− Low-side potential
V+ High side potential
$V^*_{u1}$ Three-phase output voltage command value (First-phase AC voltage command value)
$V^*_{v1}$ Three-phase output voltage command value (Second-phase AC voltage command value)
$V^*_{w1}$ Three-phase output voltage command value (Third-phase AC voltage command value)
$V^*_{u2}$ Corrected command value (Corrected first-phase AC command value)
$V^*_{v2}$ Corrected command value (Corrected second-phase AC command value)

$V^*_{w2}$ Corrected command value (Corrected third-phase AC command value)
V0 Neutral point potential
$V_{DB}$ Predetermined voltage command value
$V_{DBH}$ Dead band upper limit value (Predetermined voltage command value)
$V_{DBL}$ Dead band lower limit value (Predetermined voltage command value)
Vu, Vv, Vw Three-phase output voltage
X0 Zero cross vicinity region
Zx1 First zero-cross
Zx2 Second zero-cross
Zx3 Third zero-cross
Zx4 Fourth zero-cross
Zx5 Fifth zero-cross
zx6 Sixth zero-cross
$\Delta V^*$ Difference value (Correction amount)

The invention claimed is:

1. A power conversion device comprising:
a three-level inverter circuit including a plurality of semiconductor switching elements; and
an inverter control circuit outputting a gate signal to driving the three-level inverter circuit in a double carrier modulation manner, the inverter control circuit including
a command value calculating part generating three-phase output voltage command values having one AC voltage command value and other two AC voltage command values based on an output current and an output voltage from the three-level inverter circuit,
a command value correcting part outputting corrected command values by correcting the three-phase output voltage command values, and
a gate signal generating part generating the gate signal based on the corrected command values,
wherein the command value correcting part is configured to, during a dead band passage period in which the one AC voltage command value passes through a dead band predetermined around a zero value of a voltage command value, output a predetermined voltage command value corresponding to an end of the dead band instead of the one AC voltage command value, and distribute a difference between the one AC voltage command value and the predetermined voltage command value in the dead band passage period to each of the other two AC voltage command values.

2. The power conversion device according to claim 1, wherein the command value correcting part includes a dead band setting part capable of changing a width of the dead band.

3. The power conversion device according to claim 1, wherein the command value correcting part includes a dead band passage detecting part detecting the dead band passage period, the dead band passage period is a period between a first time and a second time, the first time is a time at which the one AC voltage command value enters the dead band, and the second time is a time at which the one AC voltage command value departs from the dead band.

4. The power conversion device according to claim 1, wherein the command value correcting part includes
a correction amount calculating part calculating the difference between the one AC voltage command value and the predetermined voltage command value in the dead band passage period, and
a correction calculation part configured to fix the one AC voltage command value to the predetermined voltage command value by adding the difference to the one AC voltage command value, and to add the difference to each of the other two AC voltage command values.

* * * * *